United States Patent
Kim et al.

(10) Patent No.: US 11,603,917 B2
(45) Date of Patent: Mar. 14, 2023

(54) DRIVING SYSTEM HAVING OIL CIRCULATION STRUCTURE

(71) Applicants: HYUNDAI MOTOR COMPANY, Seoul (KR); KIA MOTORS CORPORATION, Seoul (KR)

(72) Inventors: Jun Young Kim, Seoul (KR); Sang Jin Park, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 421 days.

(21) Appl. No.: 17/030,916

(22) Filed: Sep. 24, 2020

(65) Prior Publication Data

US 2022/0018430 A1    Jan. 20, 2022

(30) Foreign Application Priority Data

Jul. 15, 2020    (KR) .......................... 10-2020-0087631

(51) Int. Cl.
*F16H 57/04*    (2010.01)

(52) U.S. Cl.
CPC ..... *F16H 57/0423* (2013.01); *F16H 57/0447* (2013.01); *F16H 57/0495* (2013.01)

(58) Field of Classification Search
CPC ............... F16H 57/045; F16H 57/0423; F16H 57/0447; F16H 57/0495
See application file for complete search history.

(56) References Cited

U.S. PATENT DOCUMENTS

| | | | |
|---|---|---|---|
| 1,978,835 A | 10/1934 | Cotterman | |
| 5,115,887 A * | 5/1992 | Smith | F16H 57/0447 184/6.12 |
| 8,267,223 B2 | 9/2012 | Ideshio et al. | |
| 9,856,971 B2 | 1/2018 | Mikami et al. | |
| 11,054,019 B2 | 7/2021 | Lamm et al. | |
| 2009/0277512 A1* | 11/2009 | Barker | F16H 57/0447 137/391 |
| 2013/0133454 A1* | 5/2013 | Barthel | F03D 80/70 74/468 |
| 2019/0170243 A1 | 6/2019 | Brizendine et al. | |

FOREIGN PATENT DOCUMENTS

| | | |
|---|---|---|
| DE | 41 32 780 A1 | 4/1992 |
| KR | 10-1509928 B1 | 4/2015 |

OTHER PUBLICATIONS

U.S. Office Action dated Jul. 29, 2021, issued in corresponding U.S. Appl. No. 17/031,419.

* cited by examiner

*Primary Examiner* — Jake Cook
(74) *Attorney, Agent, or Firm* — Morgan, Lewis & Bockius LLP

(57) ABSTRACT

Disclosed is a driving system having an oil circulation structure in which churned oil is collected in a housing and in which the collected oil is efficiently distributed to driving structures, which include a motor and a speed reducer, thereby smoothly cooling and lubricating the respective driving structures. In addition, it is possible to adjust the level of the oil depending on whether the driving structures are in a low-load state or a high-load state, thereby improving lubrication and cooling performance.

18 Claims, 13 Drawing Sheets

DRIVING SYSTEM HAVING OIL CIRCULATION STRUCTURE

CROSS-REFERENCE TO THE RELATED APPLICATION

This application claims priority from Korean Patent Application No. 10-2020-0087631, filed on Jul. 15, 2020, in the Korean Intellectual Property Office, the disclosure of which is incorporated herein by reference in its entirety.

TECHNICAL FIELD

The present disclosure relates to a driving system having an oil circulation structure in which oil for cooling and lubrication automatically circulates upon operation of a driving structure in a motor apparatus and in which an oil level is adjusted in accordance with the state of the driving structure.

BACKGROUND

In recent years, as environmental issues have become a global concern, studies on eco-friendly vehicle technology for reducing vehicle exhaust emissions and improving fuel efficiency have been actively conducted. Representative examples of eco-friendly vehicles are hybrid vehicles and electric vehicles.

Such eco-friendly vehicles are equipped with a motor as a power source, which includes a shaft disposed at the center of the interior of a motor housing, a rotor core having a permanent magnet, a spider integrally connecting the shaft to the rotor core, a stator core disposed around the outer circumference of the rotor core, and a coil surrounding both sides of the stator core. In order to cool the motor, there are provided an oil pump, which is mounted on the outer surface of the motor housing and is disposed coaxially with the shaft, a cooling oil supply line, which extends from an outlet of the oil pump to the inner surface of the spider, and a cooling oil return line, which connects the bottom surface of the motor housing, which is filled with a cooling oil, to an inlet of the oil pump.

Further, when the motor is provided with a speed reducer, a structure for cooling the speed reducer is additionally provided. Accordingly, the cooling structure of the motor and the speed reducer becomes complicated, and the overall size thereof increases, thus making it difficult to manufacture a compact apparatus.

The information disclosed in this Background section is only for enhancement of understanding of the general background of the disclosure and should not be taken as an acknowledgement or any form of suggestion that this information forms the related art already known to a person skilled in the art.

SUMMARY

Therefore, the present disclosure has been made in view of the above problems, and it is an object of the present disclosure to provide a driving system having an oil circulation structure in which oil for cooling and lubrication automatically circulates to perform cooling and lubrication upon operation of a driving structure in a motor apparatus and in which an oil level is adjusted in accordance with the state of the driving structure.

In accordance with the present disclosure, the above and other objects can be accomplished by the provision of a driving system having an oil circulation structure, including: a first housing including a first inner space, accommodating a first driving structure and storing oil, and a first reservoir, collecting oil churned by the first driving structure; a second housing engaged with a lateral portion of the first housing, the second housing including a second inner space, accommodating a second driving structure configured to transmit and receive power to and from the first driving structure and communicating with the first inner space to share oil with the first inner space, and a second reservoir, connected to the first reservoir to receive oil from the first reservoir; a first valve configured to selectively allow the flow of oil from the first reservoir to the second reservoir; a second valve configured to selectively allow the flow of oil between the first inner space and the second inner space; and a controller configured to control the opening degrees of the first valve and the second valve to adjust the amount of oil in the first inner space and the second inner space.

The first reservoir may be configured to communicate with the first inner space such that the oil collected therein is supplied to the first driving structure, and the second reservoir may be configured to communicate with the second inner space such that the oil collected therein is supplied to the second driving structure.

The first reservoir and the second reservoir may be connected to each other via a reservoir passage such that oil circulates therebetween, and the first valve may be provided in the reservoir passage. The first inner space and the second inner space may be connected to each other via an inner-space passage such that oil circulates therebetween, and the second valve may be provided in the inner-space passage.

The first reservoir may be provided with a recirculation device so as to be spaced apart from the reservoir passage. When the level of the oil collected in the first reservoir exceeds a predetermined level, the oil may recirculate to the first inner space through the recirculation device.

The first inner space and the second inner space may be provided therebetween with a bypass passage so as to be spaced apart from the inner-space passage. When the level of the oil stored in the first inner space or the second inner space exceeds a predetermined level, the oil may circulate between the first inner space and the second inner space through the bypass passage.

The controller may receive information about the states of the first driving structure and the second driving structure, and may control the opening degrees of the first valve and the second valve in accordance with the states of the first driving structure and the second driving structure to adjust the amount of oil in the first inner space or the second inner space.

When the first driving structure is in a first-stage overheated state, the controller may close the first valve and may open the second valve.

When the first driving structure is in a second-stage overheated state, the controller may close both the first valve and the second valve.

When the second driving structure is in an overheated state, the controller may open the first valve and may close the second valve.

When both the first driving structure and the second driving structure are in a normal state or in an overheated state, the controller may open both the first valve and the second valve.

The driving system may further include a drive shaft passing through the first housing and the second housing. The first driving structure may be configured as a reduction gear set reducing the rotational torque of the drive shaft, and the second driving structure may be configured as a motor applying power to the drive shaft.

The reduction gear set may include a differential gear engaged with the drive shaft and a reduction gear disposed above the differential gear and connected to the differential gear.

The first housing may be provided with a differential cover supporting the differential gear. The first reservoir may include a first collection portion disposed in the differential cover and a second collection portion disposed so as to be spaced apart from the differential cover and disposed in the first housing.

The differential cover may include a body configured to allow the drive shaft to pass therethrough and configured to support the differential gear. The first collection portion may be disposed at an upper portion of the body so as to be open upwards to collect churned oil.

The first collection portion may communicate with the first inner space so as to provide the collected oil to the drive shaft, and may be connected to the second reservoir via the reservoir passage.

The first housing may be provided with a guide portion located above the differential gear such that oil churned by the differential gear comes into contact therewith. The guide portion may guide oil coming into contact therewith such that the oil moves toward the first collection portion and the second collection portion.

The guide portion may have a predetermined area, and both end portions thereof may bend downwards.

The second collection portion may be configured to be open toward the guide portion, and may communicate with the first inner space so as to supply the collected oil to the first driving structure. The recirculation device may be disposed at the second collection portion such that, when the level of the oil collected exceeds a predetermined level, the oil recirculates to the first inner space through the recirculation device.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Hereinafter, a driving system having an oil circulation structure according to exemplary embodiments of the present disclosure will be described with reference to the accompanying drawings.

Figure 1:
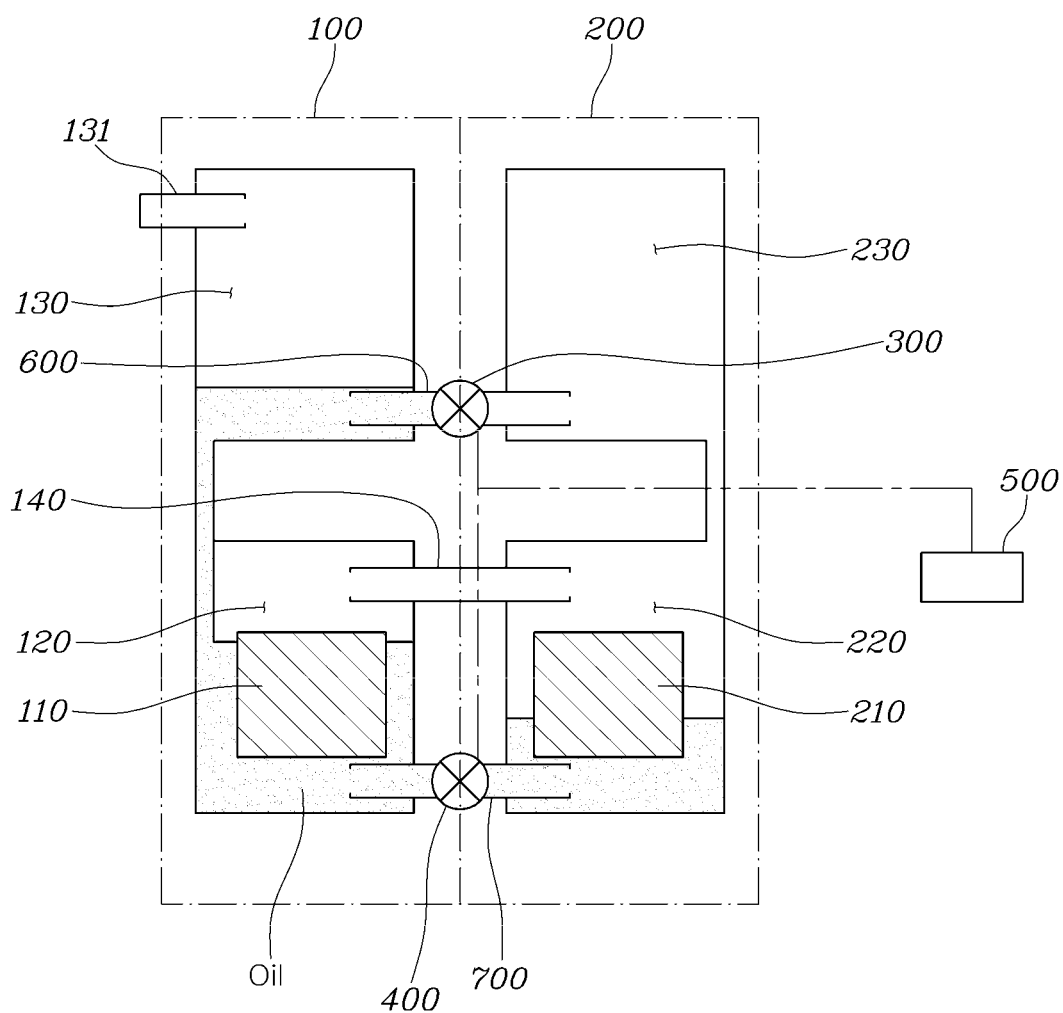
FIG. 1 is a diagram showing a driving system having an oil circulation structure according to the present disclosure.
Figure 2:
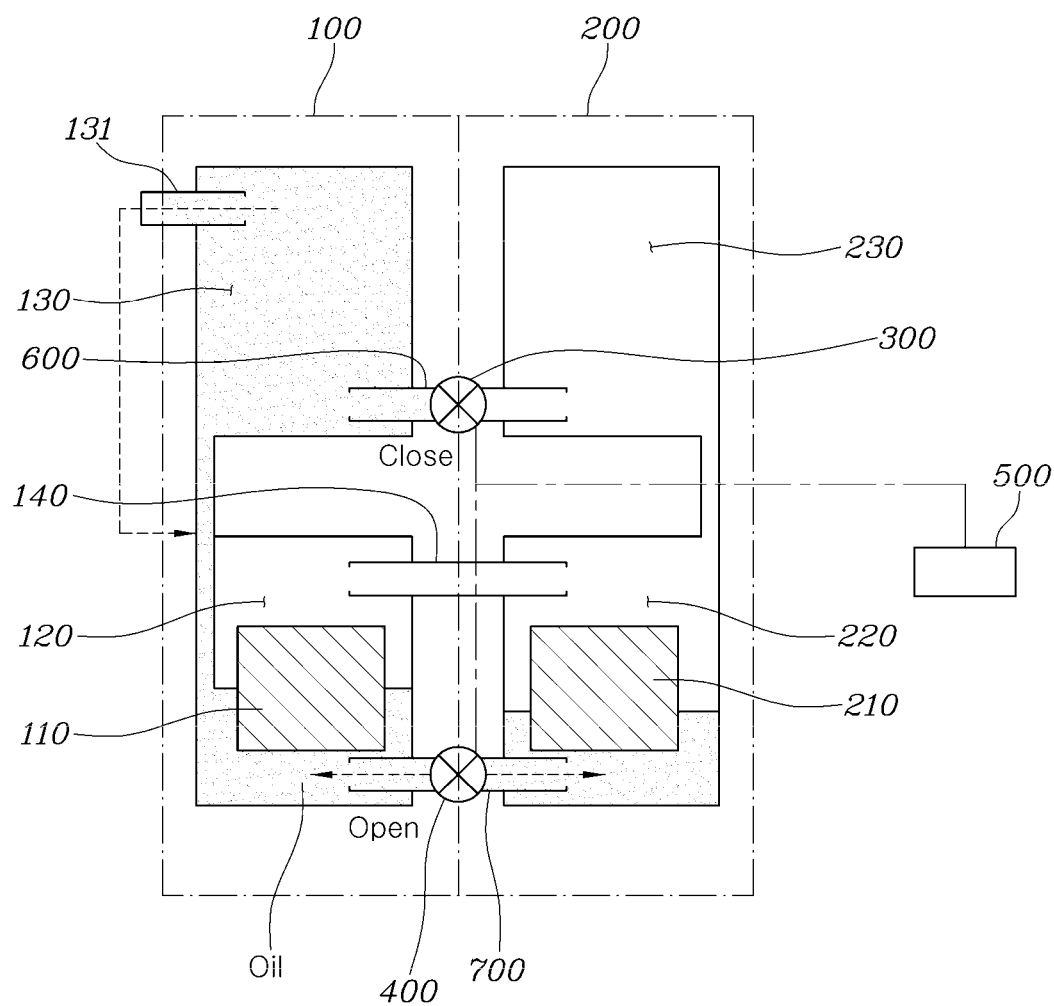
FIG. 2 is a diagram for explaining control when a first driving structure is overheated in the driving system having the oil circulation structure shown in FIG. 1.
Figure 3:
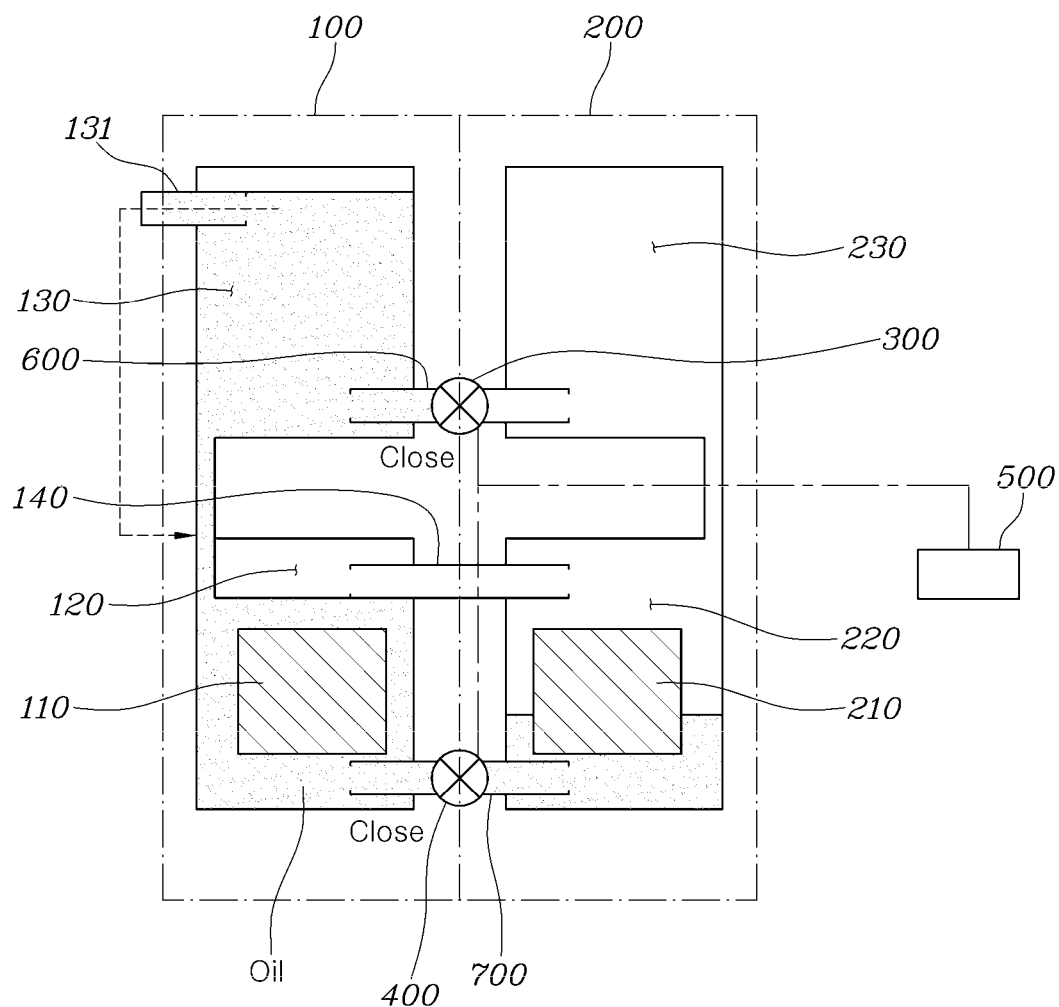
FIG. 3 is a diagram for explaining control when the first driving structure is in a second-stage overheated state in the driving system having the oil circulation structure shown in FIG. 1.
Figure 4:
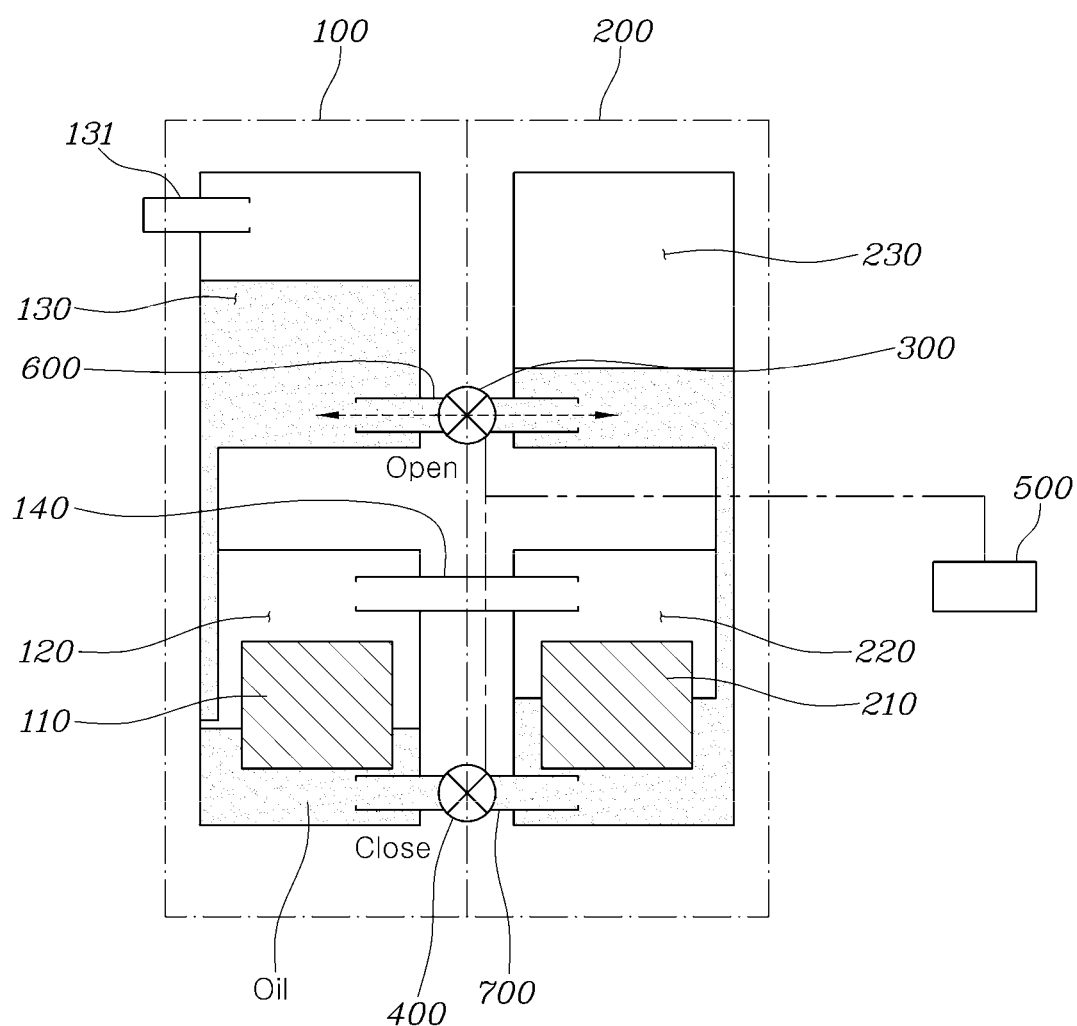
FIG. 4 is a diagram for explaining control when a second driving structure is overheated in the driving system having the oil circulation structure shown in FIG. 1.
Figure 5:
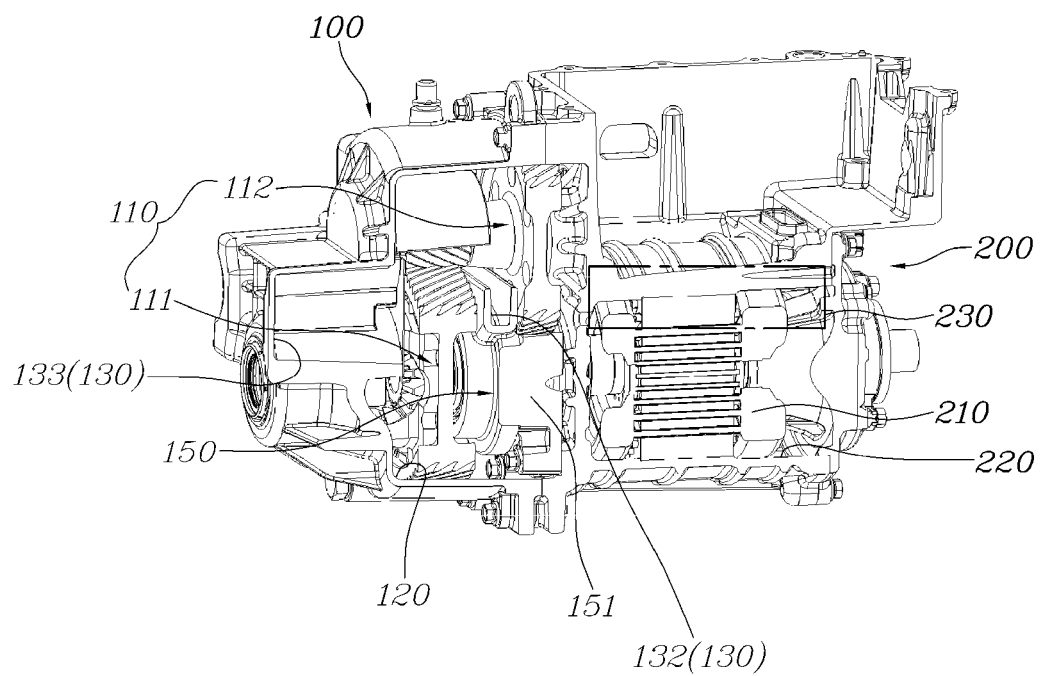
FIG. 5 is a view showing an apparatus having the oil circulation structure shown in FIG. 1.
Figure 6:
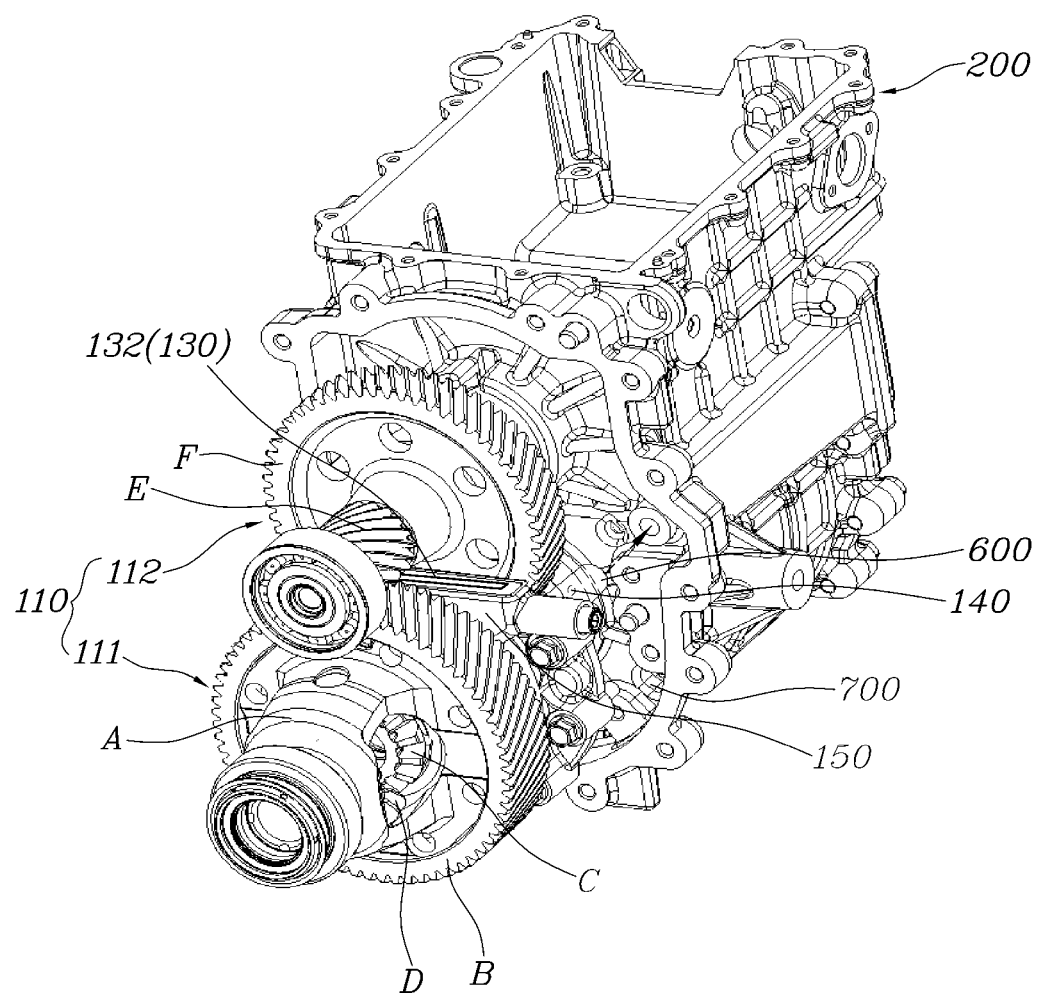
FIG. 6 is a perspective view of the apparatus having the oil circulation structure shown in FIG. 5.
Figure 7:
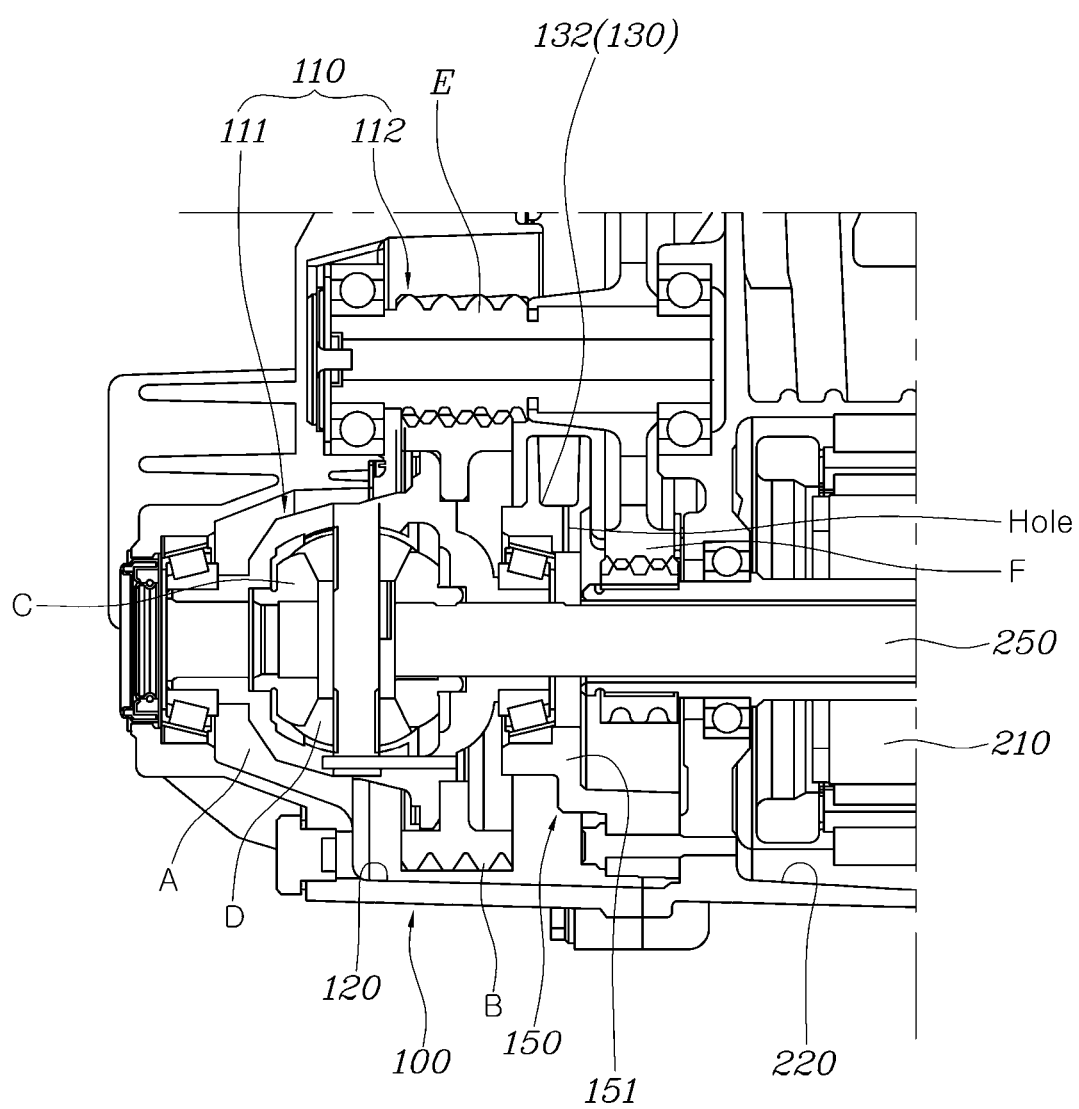
FIG. 7 is a cross-sectional view showing the first driving structure of the apparatus having the oil circulation structure shown in FIG. 5.
Figure 8:
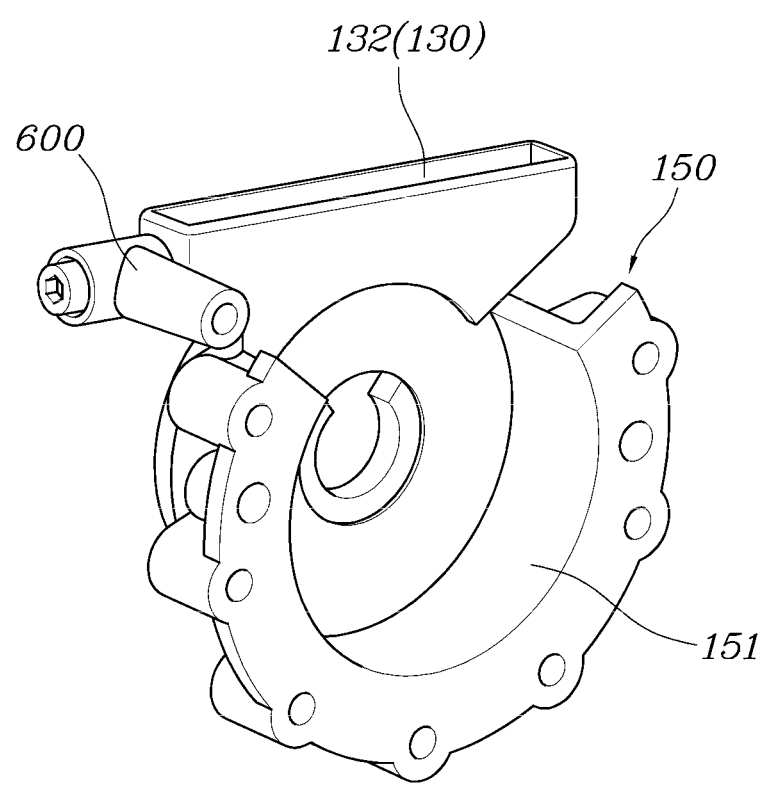
FIGS. 8 and 9 are views showing a differential cover and a reservoir passage of the apparatus having the oil circulation structure shown in FIG. 5.
Figure 9:
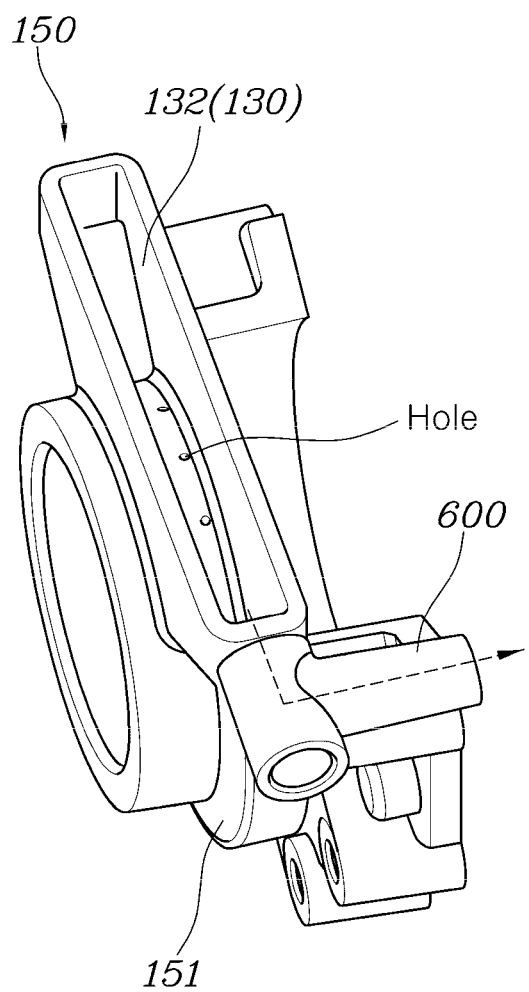
Figure 10:
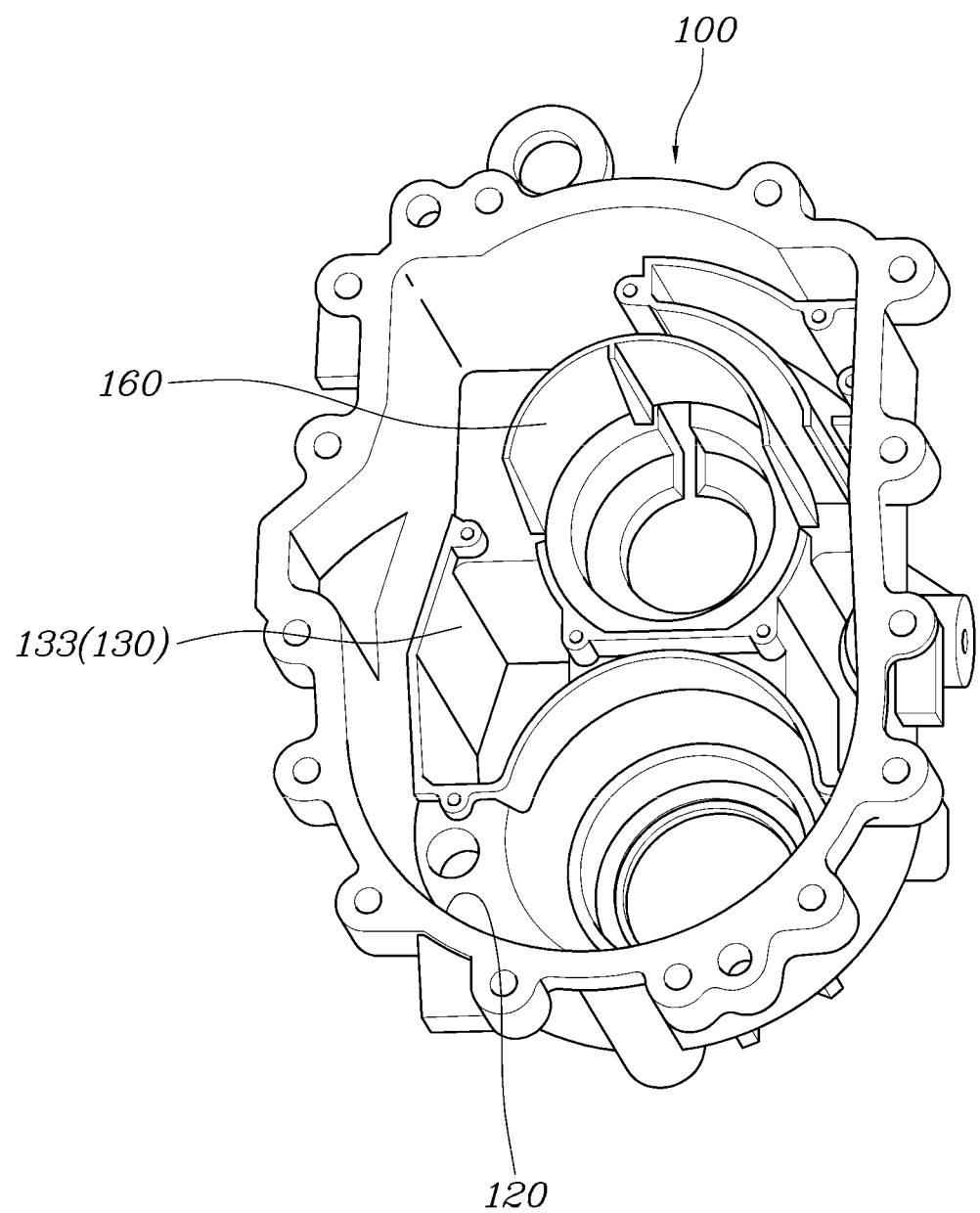
FIGS. 10 and 11 are views showing a first housing of the apparatus having the oil circulation structure shown in FIG. 5.
Figure 11:
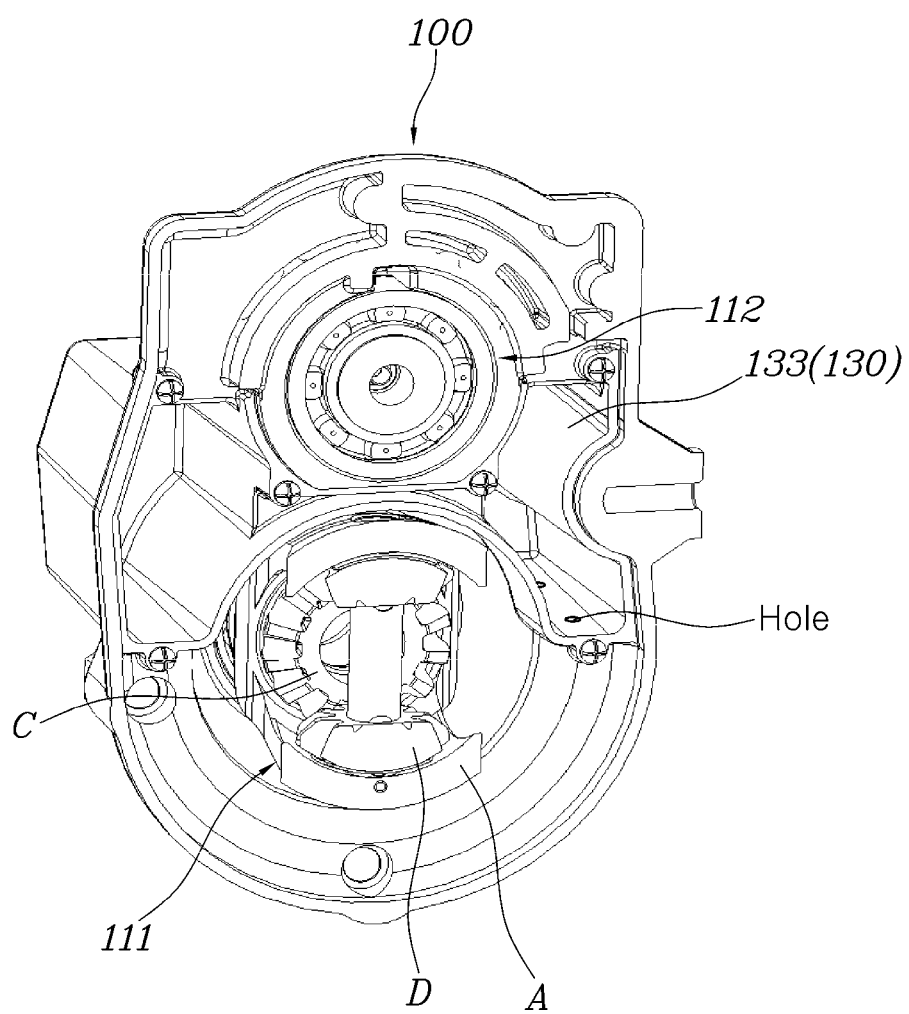
Figure 12:
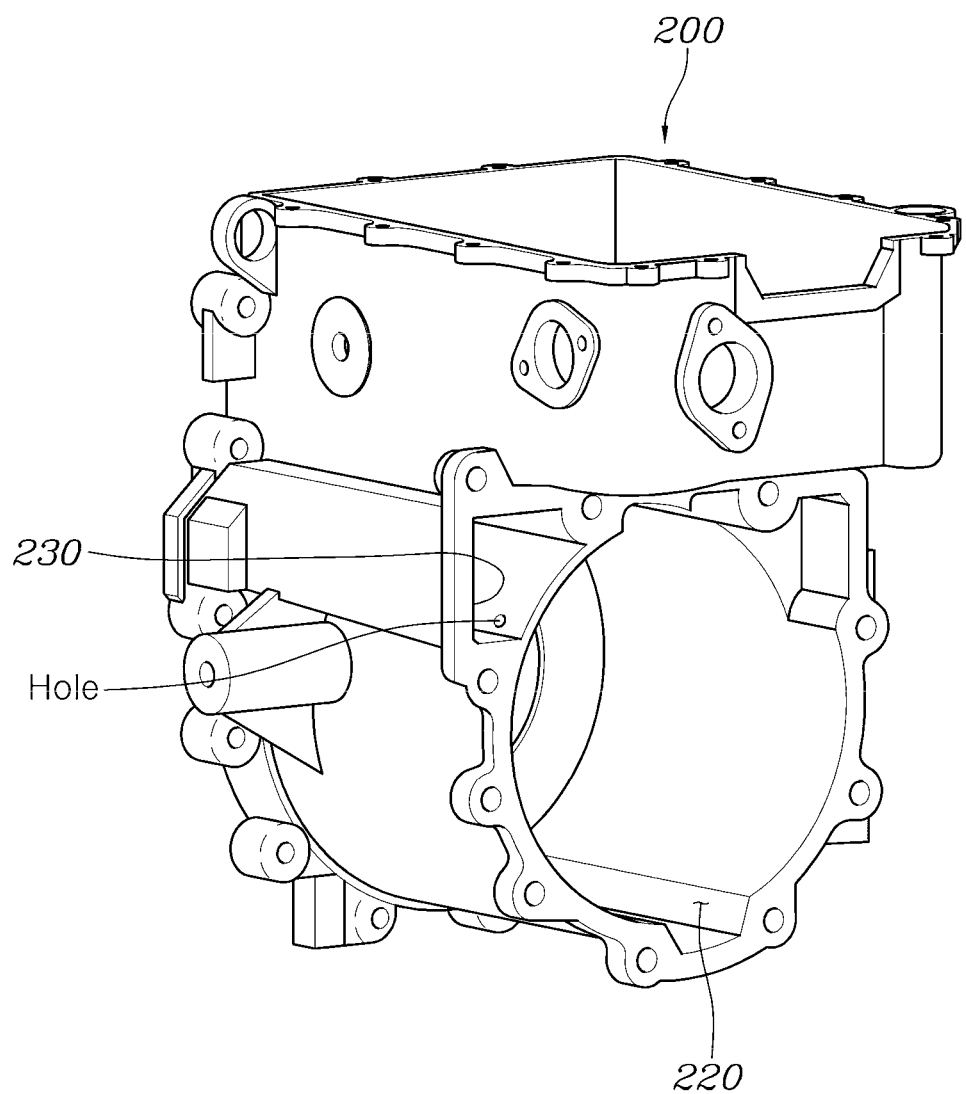
FIGS. 12 and 13 are views showing a second housing of the apparatus having the oil circulation structure shown in FIG. 5.
Figure 13:
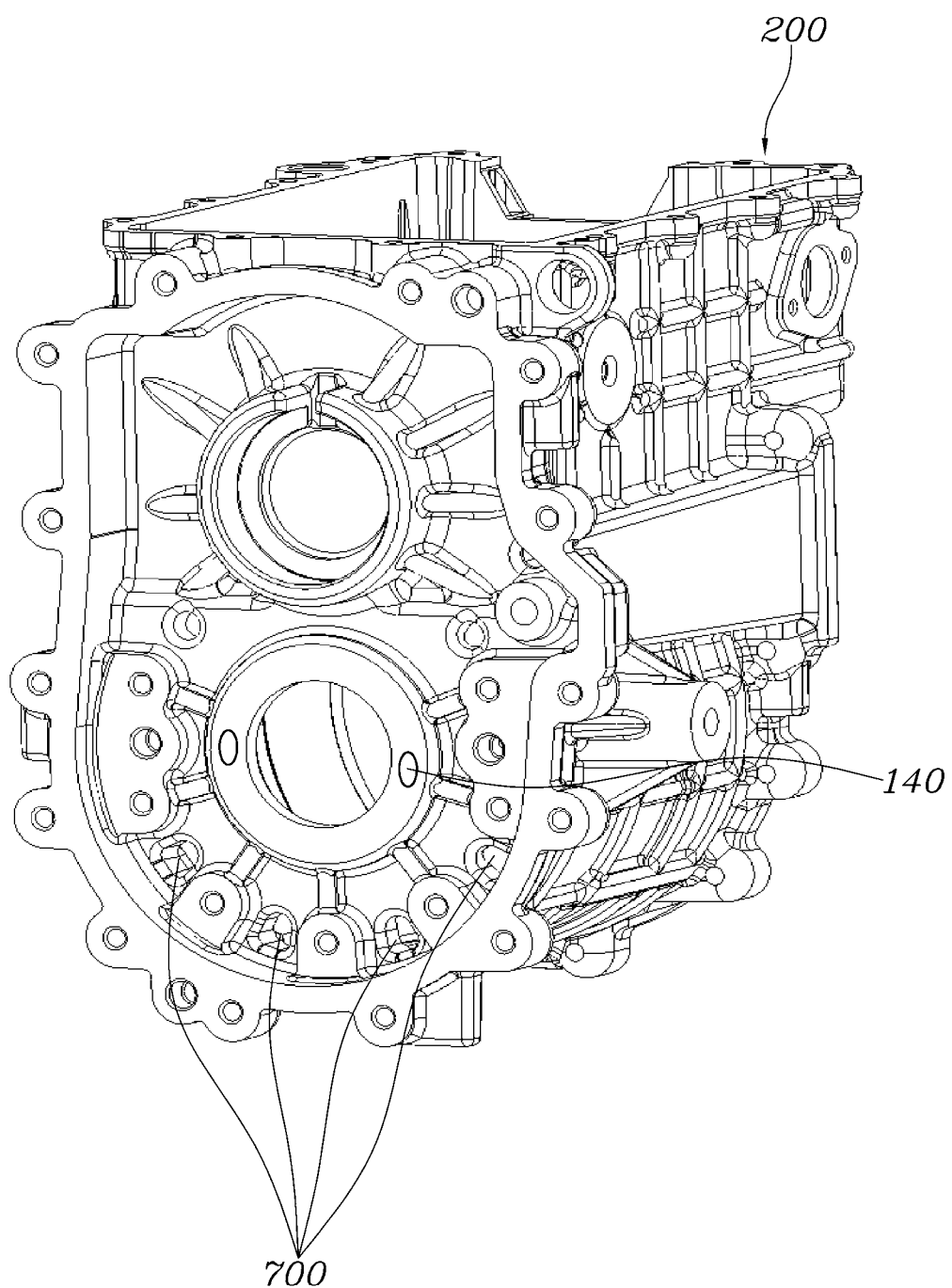

FIG. 1 is a diagram showing a driving system having an oil circulation structure according to the present disclosure, FIG. 2 is a diagram for explaining control when a first driving structure is overheated in the driving system having the oil circulation structure shown in FIG. 1, FIG. 3 is a diagram for explaining control when the first driving structure is in a second-stage overheated state in the driving system having the oil circulation structure shown in FIG. 1, FIG. 4 is a diagram for explaining control when a second driving structure is overheated in the driving system having the oil circulation structure shown in FIG. 1, FIG. 5 is a view showing an apparatus having the oil circulation structure shown in FIG. 1, FIG. 6 is a perspective view of the apparatus having the oil circulation structure shown in FIG. 5, FIG. 7 is a cross-sectional view showing the first driving structure of the apparatus having the oil circulation structure shown in FIG. 5, FIGS. 8 and 9 are views showing a differential cover and a reservoir passage of the apparatus having the oil circulation structure shown in FIG. 5, FIGS. 10 and 11 are views showing a first housing of the apparatus having the oil circulation structure shown in FIG. 5, and FIGS. 12 and 13 are views showing a second housing of the apparatus having the oil circulation structure shown in FIG. 5.

As shown in FIG. 1, a driving system having an oil circulation structure according to the present disclosure includes a first housing 100, a second housing 200 engaged with a lateral portion of the first housing 100, a first valve 300, a second valve 400, and a controller 500. The first housing 100 includes a first inner space 120, in which a first driving structure 110 is provided and in which oil is contained, and a first reservoir 130, in which oil churned by the first driving structure 110 collects. The second housing 200 includes a second inner space 220, in which a second driving structure 210, configured to transmit and receive power to and from the first driving structure 110, is provided and which communicates with the first inner space 120 to share the oil with the first inner space 120, and a second reservoir 230, which is connected to the first reservoir 130 to receive the oil from the first reservoir 130. The first valve 300 selectively allows the flow of oil from the first reservoir 130 to the second reservoir 230. The second valve 400 selectively allows the flow of oil between the first inner space 120 and the second inner space 220. The controller 500 controls the opening degrees of the first valve 300 and the second valve 400 to adjust the amount of oil in the first inner space 120 and the second inner space 220.

The first driving structure 110 and the second driving structure 210 are configured to reciprocally transmit power to each other. Both the first driving structure 110 and the second driving structure 210 may be configured as speed reducers, or may be configured as motors. Alternatively, one of the first driving structure 110 and the second driving structure 210 may be configured as a speed reducer, and the other one thereof may be configured as a motor. According to the present disclosure, the first driving structure 110 is configured as a reduction gear set and the second driving structure 210 is configured as a motor such that power transmission is performed therebetween. The first housing 100 provided with the first driving structure 110 and the second housing 200 provided with the second driving structure 210 may be integrally formed with each other, or may be provided separately from each other and may be engaged with each other.

Oil for lubrication and cooling is contained in the first housing 100 and the second housing 200 such that a portion of the first driving structure 110 and a portion of the second driving structure 210 are immersed in the oil. Accordingly, when the second driving structure 210, which is configured as a motor, operates, oil is churned by the first driving structure 110 and the second driving structure 210 due to the rotation of the second driving structure 210.

For this reason, according to the present disclosure, the first reservoir 130 for collecting oil churned by the first driving structure 110 is formed in the first housing 100, and the second reservoir 230, connected to the first reservoir 130 to receive oil therefrom, is formed in the second housing 200. Accordingly, the oil churned by the operation of the first driving structure 110 is collected in the first reservoir 130, and the oil collected in the first reservoir 130 circulates to the first driving structure 110. Further, the oil delivered through the first reservoir 130 is stored in the second reservoir 230, and the oil stored in the second reservoir 230 circulates to the second driving structure 210. Accordingly, cooling and lubrication efficiency is improved due to efficient oil circulation in the first housing 100 and the second housing 200.

Further, according to the present disclosure, the first valve 300 is provided between the first reservoir 130 and the second reservoir 230, and the second valve 400 is provided between the first inner space 120 and the second inner space 220. The first valve 300 adjusts the amount of oil flowing between the first reservoir 130 and the second reservoir 230 according to the opening degree thereof, and the second valve 400 adjusts the amount of oil flowing between the first inner space 120 and the second inner space 220 according to the opening degree thereof. The opening degrees of the first valve 300 and the second valve 400 are controlled by the controller 500. Accordingly, it is possible to efficiently circulate the oil according to the states of the first driving structure 110 and the second driving structure 210.

As such, according to the present disclosure, when the first valve 300 and the second valve 400 are maintained in an open state, the churned oil naturally circulates to the first reservoir 130 and the second reservoir 230, thereby maintaining cooling and lubrication performance. In addition, since the opening degrees of the first valve 300 and the second valve 400 are adjusted according to the states of the first driving structure 110 and the second driving structure 210, it is possible to further improve cooling and lubrication performance through efficient oil circulation suitable for the states of the first driving structure 110 and the second driving structure 210.

Described in more detail, the first reservoir 130 may be formed to communicate with the first inner space 120 such that the oil collected therein is supplied to the first driving structure 110, and the second reservoir 230 may be formed to communicate with the second inner space 220 such that the oil collected therein is supplied to the second driving structure 210.

That is, the first reservoir 130 supplies the collected oil to the first driving structure 110, and a portion of the oil in the first reservoir 130 is delivered to the second reservoir 230 and stored in the second reservoir 230. The second reservoir 230 supplies the stored oil to the second driving structure 210. In this manner, it is possible to cool and lubricate the respective driving structures through efficient circulation of the churned oil.

The first reservoir 130 and the second reservoir 230 are connected to each other via a reservoir passage 600 such that oil circulates therebetween. The first valve 300 is provided in the reservoir passage 600. The first inner space 120 and the second inner space 220 are connected to each other via an inner-space passage 700 such that oil circulates therebetween. The second valve 400 is provided in the inner-space passage 700. Accordingly, oil is capable of circulating between the first reservoir 130 and the second reservoir 230 through the reservoir passage 600. The reservoir passage 600 may be formed as a hole or a separate pipe, via which the first reservoir 130 and the second reservoir 230 communicate with each other when the first housing 100 and the second housing 200 are mounted. Accordingly, when the oil collected in the first reservoir 130 is introduced into the reservoir passage 600, the oil may be delivered to the second reservoir 230 through the reservoir passage 600, and may be stored in the second reservoir 230. When the first valve 300 provided in the reservoir passage 600 is opened, the oil naturally circulates between the first reservoir 130 and the second reservoir 230, and when the first valve 300 is closed, the oil is stored only in the first reservoir 130.

Since the first inner space 120 and the second inner space 220 are connected to each other via the inner-space passage 700 such that oil circulates therebetween, the oil contained in the first inner space 120 and the second inner space 220 may be shared therebetween through the inner-space passage 700. When the second valve 400 provided in the inner-space passage 700 is opened, the oil naturally circulates between the first inner space 120 and the second inner space 220, and when the second valve 400 is closed, the first inner space 120 and the second inner space 220 are isolated from each other such that the oil is not capable of circulating therebetween. In this manner, the controller 500 controls the opening degrees of the first valve 300 and the second valve 400 in accordance with various situations, thereby securing efficient circulation of the oil.

The first reservoir 130 may be provided with a recirculation device 131, which is spaced apart from the reservoir passage 600. When the level of the oil collected in the first reservoir 130 exceeds a predetermined level, the oil recirculates to the first inner space 120 through the recirculation device 131.

The recirculation device 131 allows the oil to recirculate to the first inner space 120 when excess oil collects in the first reservoir 130. To this end, the recirculation device 131 may be disposed at a higher position in the first reservoir 130 than the reservoir passage 600 in the state of being spaced apart therefrom. Accordingly, when the level of the oil collected in the first reservoir 130 exceeds a predetermined level and thus the oil is introduced into the recirculation device 131, this excess collected oil recirculates to the first inner space 120 through the recirculation device 131, thereby preventing a shortage of oil from occurring in the first inner space 120.

The first inner space 120 and the second inner space 220 may be provided therebetween with a bypass passage 140, which is spaced apart from the inner-space passage 700. When the level of the oil stored in the first inner space 120 or the second inner space 220 exceeds a predetermined level, the oil circulates between the first inner space 120 and the second inner space 220 through the bypass passage 140.

The bypass passage 140 allows the first inner space 120 and the second inner space 220 to share oil when excess oil is stored in the first inner space 120 or the second inner space 220. The bypass passage 140 may be disposed at a higher position than the inner-space passage 700 in the state of being spaced apart therefrom. Accordingly, when the level of the oil stored in the first inner space 120 or the second inner space 220 exceeds a predetermined level and thus the oil is introduced into the bypass passage 140, this excess stored oil circulates through the bypass passage 140, thereby preventing both storage of excess oil and shortage of oil.

In the above-described oil circulation structure according to the present disclosure, the controller 500 receives information about the states of the first driving structure 110 and the second driving structure 210, and controls the opening degrees of the first valve 300 and the second valve 400 in accordance with the states of the first driving structure 110 and the second driving structure 210 to adjust the amount of oil in the first inner space 120 or the second inner space 220. The controller 500 may receive information about the temperature of the first driving structure 110 and the second driving structure 210. Based on the temperature information of the respective driving structures, the controller 500 may check or predict the temperature of the respective driving structures in the first housing 100 and the second housing 200.

Control of the first valve 300 and the second valve 400 by the controller 500 will now be described. When the first driving structure 110 is in a first-stage overheated state, the controller 500 may close the first valve 300, and may open the second valve 400. The first-stage overheated state corresponds to a predetermined reference temperature of the first driving structure 110, and is stored in advance in the controller 500. When the first driving structure 110 is in the first-stage overheated state, as shown in FIG. 2, the controller 500 closes the first valve 300 to prevent the oil collected in the first reservoir 130 from moving to the second reservoir 230, and opens the second valve 400 such that the first inner space 120 and the second inner space 220 share the oil, whereby both the first driving structure 110 and the second driving structure 210 are smoothly cooled. When the amount of oil collected in the first reservoir 130 exceeds a predetermined level, the oil recirculates to the first inner space 120 through the recirculation device 131, whereby the amount of oil in the first inner space 120 increases, and thus the efficiency of cooling the first driving structure 110 is improved.

When the first driving structure 110 is in a second-stage overheated state, the controller 500 may close both the first valve 300 and the second valve 400. The second-stage overheated state corresponds to a predetermined reference temperature of the first driving structure 110, which is higher than the reference temperature corresponding to the first-stage overheated state, and is stored in advance in the controller 500. When the first driving structure 110 enters the second-stage overheated state, the temperature of which is higher than that of the first-stage overheated state, and thus needs to be cooled rapidly, as shown in FIG. 3, the controller 500 closes both the first valve 300 and the second valve 400 such that the oil is concentrated in the first inner space 120, in which the first driving structure 110 is provided. That is, the first valve 300 is closed to prevent the oil collected in the first reservoir 130 from moving to the second reservoir 230, and the second valve 400 is closed to separate the first inner space 120 and the second inner space 220 from each other. Accordingly, the oil in the first housing 100 circulates only to the first reservoir 130 and the first inner space 120, and thus the first driving structure 110 is intensively cooled and lubricated, and is therefore cooled rapidly.

When the second driving structure 210 is in an overheated state, the controller 500 may open the first valve 300 and close the second valve 400. The overheated state of the second driving structure 210 corresponds to a predetermined reference temperature of the second driving structure 210, and is stored in advance in the controller 500. When the second driving structure 210 is in the overheated state, as shown in FIG. 4, the controller 500 opens the first valve 300 to allow the oil in the first reservoir 130 to move to the second reservoir 230, and closes the second valve 400 to separate the first inner space 120 and the second inner space 220 from each other. Accordingly, the oil collected in the first reservoir 130 is supplied to the second reservoir 230, and the oil in the second reservoir 230 is supplied to the second inner space 220, whereby a sufficient amount of oil is secured in the second inner space 220. As a result, the second driving structure 210 is smoothly cooled and lubricated by the oil in the second inner space 220.

When both the first driving structure 110 and the second driving structure 210 are in a normal state or in an overheated state, the controller 500 may open both the first valve 300 and the second valve 400. That is, as shown in FIG. 1, when both the first driving structure 110 and the second driving structure 210 are in a normal state or need to be cooled, the controller 500 opens both the first valve 300 and the second valve 400 such that the churned oil circulates both to the first inner space 120 and to the second inner space 220 through the first reservoir 130 and the second reservoir 230. Accordingly, both the first driving structure 110 and the second driving structure 210 are smoothly cooled and lubricated by the oil supplied thereto.

Hereinafter, an apparatus having the above-described oil circulation structure according to the present disclosure will be described in detail. As shown in FIGS. 5 to 13, a drive shaft 250 passes through the first housing 100 and the second housing 200. The first driving structure 110 may be configured as a reduction gear set that reduces the rotational torque of the drive shaft 250, and the second driving structure 210 may be configured as a motor that applies power to the drive shaft 250.

According to the present disclosure, the first driving structure 110 is configured as a reduction gear set, the second driving structure 210 is configured as a motor, the first driving structure 110 and the second driving structure 210 are integrated with each other, and the drive shaft 250 is connected to the first driving structure 110 and the second driving structure 210 in order to transmit power. Accordingly, the first housing 100, in which the first driving structure 110 is provided, and the second housing 200, in which the second driving structure 210 is provided, may be integrally formed with each other, or may be provided separately from each other and may be engaged with each other.

The reduction gear set may include a differential gear 111, which is engaged with the drive shaft 250, and a reduction gear 112, which is disposed above the differential gear 111 and is connected to the differential gear 111. The differential gear 111 and the reduction gear 112 may be formed in an appropriate gear structure selected from among various gear structures that are well known in the art. A brief description of the differential gear 111 and the reduction gear 112 will now be made. As can be seen from FIGS. 5 to 7, the differential gear 111 may be composed of a case A, a ring gear B, a differential pinion gear C, and a differential side gear D, and the reduction gear 112 may be composed of a final reduction gear E and an output gear F to reduce the rotational torque of the differential gear 111. Since the differential gear 111, which is composed of relatively large gears, is disposed below the reduction gear 112, the oil stored in the first housing 100 is strongly churned, thereby realizing efficient circulation of oil through the first reservoir 130.

The first housing 100 may be provided with a differential cover 150 for supporting the differential gear 111. The first reservoir 130 may include a first collection portion 132, which is formed in the differential cover 150, and a second collection portion 133, which is spaced apart from the differential cover 150 and is formed in the first housing 100.

The differential cover 150 may be integrally formed with the first housing 100, or may be provided separately from the first housing 100 and may be engaged therewith. The differential cover 150 may include a body 151, through which the drive shaft 250 passes and which supports the differential gear 111, and a first collection portion 132, which is formed at the upper portion of the body 151 and is open upwards to collect the churned oil. The body 151 of the differential cover 150, through which the drive shaft 250 passes, supports a bearing of the differential gear 111, and is engaged with the first housing 100. When the first housing 100 and the second housing 200 are engaged with each other, the body 151 may also be engaged with the second housing 200 and fixed thereto. Accordingly, the differential gear 111 may be firmly fixed in the first housing 100 by the first housing 100 and the differential cover 150. Since the first collection portion 132 is formed at the upper portion of the body 151, it is possible to easily collect the churned oil.

As such, since the first housing 100 and the differential cover 150 surround and support the differential gear 111, the differential gear 111 may be stably fixed. In addition, since the first collection portion 132 is formed in the differential cover 150, it is possible to dispose the first collection portion 132 in the first housing 100 merely by engaging the differential cover 150 with the first housing 100 without the necessity to perform a process for forming the first collection portion 132 in the first inner space 120.

The second collection portion 133 is spaced apart from the differential cover 150, and is formed in the first housing 100 so as to collect the churned oil together with the first collection portion 132, thereby collecting a sufficient amount of churned oil. A detailed description of the second collection portion 133 will be made later.

Meanwhile, as can be seen from FIGS. 8 and 9, the first collection portion 132 may communicate with the first inner space 120 so as to provide the collected oil to the drive shaft, and may be connected to the second reservoir 230 via the reservoir passage 600.

The reservoir passage 600 is connected to the first collection portion 132 so as to communicate therewith, and is connected to the second reservoir 230 provided in the second housing 200 so as to communicate therewith. Accordingly, the oil collected in the first collection portion 132 constituting the first reservoir 130 may move to the second reservoir 230 through the reservoir passage 600. The reservoir passage 600 may be connected to the lateral portion of the first collection portion 132 so as to avoid interference with other driving parts including the reduction gear set. Accordingly, as can be seen from FIG. 9, the reservoir passage 600 may extend laterally and then bend to extend toward the second housing 200.

As shown in FIG. 10, the first housing 100 may be provided with a guide portion 160, which is located above the differential gear 111 such that the oil churned by the differential gear 111 comes into contact therewith and which guides the oil, which comes into contact therewith, such that the oil moves toward the first collection portion 132 and the second collection portion 133.

That is, the oil that is moved upwards by the differential gear 111 adheres to the guide portion 160 or collides with the guide portion 160. The oil is guided by the guide portion 160 to move downwards toward the first collection portion 132 and the second collection portion 133. As such, since the guide portion 160 is formed above the differential gear 111 in the first housing 100, the oil churned by the differential gear 111 is guided by the guide portion 160 to move to the first collection portion 132 and the second collection portion 133, which constitute the first reservoir 130, whereby a sufficient amount of oil is collected in the first reservoir 130.

In detail, the guide portion 160 may be formed to have a predetermined area, and both end portions thereof may bend downwards. That is, the guide portion 160 has a predetermined area so as to increase the contact area with the churned oil, and both end portions thereof bend downwards toward the first collection portion 132 and the second collection portion 133 such that the oil coming into contact with the guide portion 160 moves along the guide portion 150 to the first reservoir 220.

The second collection portion 133 is formed to be open toward the guide portion 160, and communicates with the first inner space 120 so as to supply the collected oil to the first driving structure 110. The recirculation device 131 may be formed at the second collection portion 133 such that, when the level of the oil collected exceeds a predetermined level, the oil recirculates to the first inner space 120 through the recirculation device 131.

When the reduction gear set rotates upon operation of the first driving structure 110, the oil churned by the reduction gear set is collected in the first collection portion 132 and the second collection portion 133, and the oil collected in the first collection portion 132 and the second collection portion 133 is delivered to the second inner space 220 through the first inner space 120 or the second reservoir 230, thereby improving the cooling and lubrication effect through efficient circulation of oil. In particular, since the second collection portion 133 is disposed so as to be spaced apart from the first collection portion 132 in the first housing 100, it is possible to more effectively collect the churned oil, which moves irregularly, and to efficiently cool and lubricate the parts in the first housing 100 that need to be cooled and lubricated.

The recirculation device 131 is formed at the second collection portion 133 so as to recirculate the excess oil to the first inner space 120. The recirculation device 131 may be configured as a hole formed in the second collection portion 133 so as to be open upwards toward the guide portion 160. Accordingly, the excess oil collected in the second collection portion 133 may overflow through the recirculation device 131 disposed thereabove, and may circulate to the first inner space 120.

The first and second collection portions 132 and 133, which constitute the above-described first reservoir 130, and the second reservoir 230 may have drain holes formed therein to communicate with the first inner space 120 and the second inner space 220 in order to realize circulation of oil. In addition, the inner-space passage 700 is formed in the first housing 100 and the second housing 200 such that the first inner space 120 and the second inner space 220 share the oil.

In addition, since the bypass passage 140 is formed above the inner-space passage 700 in the state of being spaced apart therefrom, when the amount of oil stored in the first inner space 120 or the second inner space 220 exceeds a predetermined level, it is possible to adjust the amount of oil using the bypass passage 140.

The aforementioned operations/functions performed by the controller can be embodied as computer readable code/algorithm/software stored on a computer readable recording medium. The computer readable recording medium is any data storage device that can store data which can thereafter be read by a computer or a processor/microprocessor. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

The aforementioned controller may include one or more processors/microprocessors. The controller may be implemented with circuits. The controller may perform the above described operations/functions, by executing the computer readable code/algorithm/software stored on the computer readable recording medium.

As is apparent from the above description, according to a driving system having an oil circulation structure according to the present disclosure, churned oil is collected in a housing, and the collected oil is efficiently distributed to driving structures, which include a motor and a speed reducer, thereby smoothly cooling and lubricating the respective driving structures. In addition, it is possible to adjust the level of the oil depending on whether the driving structures are in a low-load state or a high-load state, thereby improving lubrication and cooling performance.

Although exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A driving system having an oil circulation structure, comprising:
   a first housing comprising a first inner space, accommodating a first driving structure and storing oil, and a first reservoir, collecting oil churned by the first driving structure;
   a second housing engaged with a lateral portion of the first housing, the second housing comprising a second inner space, accommodating a second driving structure configured to transmit and receive power to and from the first driving structure and communicating with the first inner space to share oil with the first inner space, and a second reservoir, connected to the first reservoir to receive oil from the first reservoir;
   a first valve configured to selectively allow flow of oil from the first reservoir to the second reservoir;
   a second valve configured to selectively allow flow of oil between the first inner space and the second inner space; and
   a controller configured to control opening degrees of the first valve and the second valve to adjust an amount of oil in the first inner space and the second inner space.

2. The driving system of claim 1, wherein the first reservoir is configured to communicate with the first inner space such that the oil collected therein is supplied to the first driving structure, and
   wherein the second reservoir is configured to communicate with the second inner space such that the oil collected therein is supplied to the second driving structure.

3. The driving system of claim 2, wherein the first reservoir and the second reservoir are connected to each other via a reservoir passage such that oil circulates therebetween, wherein the first valve is provided in the reservoir passage,
   wherein the first inner space and the second inner space are connected to each other via an inner-space passage such that oil circulates therebetween, and
   wherein the second valve is provided in the inner-space passage.

4. The driving system of claim 3, wherein the first reservoir is provided with a recirculation device so as to be spaced apart from the reservoir passage, and
   wherein, when a level of oil collected in the first reservoir exceeds a predetermined level, the oil recirculates to the first inner space through the recirculation device.

5. The driving system of claim 3, wherein the first inner space and the second inner space are provided therebetween with a bypass passage so as to be spaced apart from the inner-space passage, and
   wherein, when a level of oil stored in the first inner space or the second inner space exceeds a predetermined level, the oil circulates between the first inner space and the second inner space through the bypass passage.

6. The driving system of claim 1, wherein the controller receives information about states of the first driving structure and the second driving structure, and controls the opening degrees of the first valve and the second valve in accordance with the states of the first driving structure and the second driving structure to adjust an amount of oil in the first inner space or the second inner space.

7. The driving system of claim 6, wherein, when the first driving structure is in a first-stage overheated state, the controller closes the first valve and opens the second valve.

8. The driving system of claim 6, wherein, when the first driving structure is in a second-stage overheated state, the controller closes both the first valve and the second valve.

9. The driving system of claim 6, wherein, when the second driving structure is in an overheated state, the controller opens the first valve and closes the second valve.

10. The driving system of claim 6, wherein, when both the first driving structure and the second driving structure are in a normal state or in an overheated state, the controller opens both the first valve and the second valve.

11. The driving system of claim 1, further comprising:
    a drive shaft passing through the first housing and the second housing,
    wherein the first driving structure is configured as a reduction gear set reducing a rotational torque of the drive shaft, and
    wherein the second driving structure is configured as a motor applying power to the drive shaft.

12. The driving system of claim 11, wherein the reduction gear set comprises:
    a differential gear engaged with the drive shaft; and
    a reduction gear disposed above the differential gear and connected to the differential gear.

13. The driving system of claim 12, wherein the first housing is provided with a differential cover supporting the differential gear, and
    wherein the first reservoir comprises:
    a first collection portion disposed in the differential cover; and a second collection portion spaced apart from the differential cover and disposed in the first housing.

14. The driving system of claim 13, wherein the differential cover comprises:
a body configured to allow the drive shaft to pass therethrough and configured to support the differential gear, and
wherein the first collection portion is disposed at an upper portion of the body so as to be open upwards to collect the churned oil.

15. The driving system of claim 13, wherein the first collection portion communicates with the first inner space so as to provide the collected oil to the drive shaft, and is connected to the second reservoir via a reservoir passage.

16. The driving system of claim 13, wherein the first housing is provided with a guide portion located above the differential gear such that oil churned by the differential gear comes into contact therewith, and
wherein the guide portion guides oil coming into contact therewith such that the oil moves toward the first collection portion and the second collection portion.

17. The driving system of claim 16, wherein the guide portion has a predetermined area, and
wherein both end portions of the guide portion bend downwards.

18. The driving system of claim 16, wherein the second collection portion is configured to be open toward the guide portion, and communicates with the first inner space so as to supply collected oil to the first driving structure, and
wherein a recirculation device is disposed at the second collection portion such that, when a level of oil collected exceeds a predetermined level, the oil recirculates to the first inner space through the recirculation device.

* * * * *